(12) United States Patent
Gaid et al.

(10) Patent No.: US 10,118,850 B2
(45) Date of Patent: Nov. 6, 2018

(54) PROCESS FOR THE TREATMENT OF A FLOW OF WASTE WATER BY LOW-PRESSURE FILTRATION

(71) Applicant: Veolia Water Solutions & Technologies Support, Saint Maurice (FR)

(72) Inventors: Abdelkader Gaid, Paris (FR); Catherine Daines-Martinez, Andresy (FR); Sebastien Logette, Villeurbanne (FR); Christophe Amiel, Boulogne Billancourt (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 0 days.

(21) Appl. No.: 15/321,789

(22) PCT Filed: Jun. 23, 2015

(86) PCT No.: PCT/FR2015/051685
§ 371 (c)(1),
(2) Date: Dec. 23, 2016

(87) PCT Pub. No.: WO2015/197973
PCT Pub. Date: Dec. 30, 2015

(65) Prior Publication Data
US 2017/0129797 A1    May 11, 2017

(30) Foreign Application Priority Data
Jun. 27, 2014   (FR) ..................................... 14 56040

(51) Int. Cl.
*C02F 9/00*       (2006.01)
*B01D 65/08*      (2006.01)
(Continued)

(52) U.S. Cl.
CPC ................ *C02F 9/00* (2013.01); *B01D 61/58* (2013.01); *B01D 65/08* (2013.01); *C02F 1/444* (2013.01);
(Continued)

(58) Field of Classification Search
CPC .......... C02F 9/00; C02F 5/14; C02F 2303/24; C02F 2303/10; C02F 2101/32;
(Continued)

(56) References Cited

U.S. PATENT DOCUMENTS 9,039,897 B2    5/2015  Stroot
2011/0062081 A1*  3/2011  Daines-Martinez ...... C02F 1/44
                                                    210/636
(Continued)

FOREIGN PATENT DOCUMENTS

EP      223463 A2 *  10/2010
FR    2970961 A1 *   8/2012
(Continued)

OTHER PUBLICATIONS

Najafpour, Ghasem D., "Cross-flow microfiltration", Biochemical Engineering and Biotechnology (Jan. 1, 2007), XP055173951, p. 362.

*Primary Examiner* — Fred Prince
(74) *Attorney, Agent, or Firm* — Coats & Bennett, PLLC

(57) ABSTRACT

In order to treat a flow of waste water, there is applied to this flow, after at most an optional pre-treatment of screening/degritting or deoiling, a filtration treatment by means of microfiltration or ultrafiltration membranes, by causing the flow to circulate tangentially to the membranes at a velocity of at least 0.1 m/s, in the presence of an organic sequestering agent composed based on organic phosphate at a concentration that is effective for sequestering metal ions contained in the flow and minimizing the formation of calcium car- (Continued)

Figure 1:
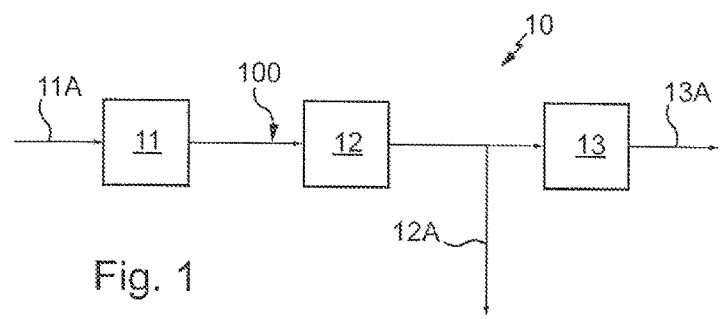

bonate, with a differential pressure on either side of the membranes that is less than or equal to 5 bar.

12 Claims, 2 Drawing Sheets

(51) Int. Cl.
| | |
|---|---|
| *C02F 1/44* | (2006.01) |
| *C02F 1/68* | (2006.01) |
| *C02F 5/14* | (2006.01) |
| *B01D 61/58* | (2006.01) |
| *C02F 3/30* | (2006.01) |
| *C02F 11/04* | (2006.01) |
| *B01D 61/02* | (2006.01) |
| *B01D 61/14* | (2006.01) |
| *C02F 101/20* | (2006.01) |
| *C02F 101/32* | (2006.01) |
| *C02F 101/10* | (2006.01) |
| *C02F 101/16* | (2006.01) |

(52) U.S. Cl.
CPC ............... *C02F 1/683* (2013.01); *C02F 5/14* (2013.01); *B01D 61/025* (2013.01); *B01D 61/027* (2013.01); *B01D 61/145* (2013.01); *B01D 61/147* (2013.01); *B01D 2311/12* (2013.01); *B01D 2311/2688* (2013.01); *B01D 2315/10* (2013.01); *C02F 1/441* (2013.01); *C02F 1/442* (2013.01); *C02F 3/302* (2013.01); *C02F 3/307* (2013.01); *C02F 11/04* (2013.01); *C02F 2101/105* (2013.01); *C02F 2101/16* (2013.01); *C02F 2101/20* (2013.01); *C02F 2101/32* (2013.01); *C02F 2303/10* (2013.01); *C02F 2303/16* (2013.01); *C02F 2303/24* (2013.01); *Y02E 50/343* (2013.01); *Y02W 10/30* (2015.05)

(58) Field of Classification Search
CPC .......... C02F 101/32; C02F 3/307; C02F 3/30; C02F 2101/16; C02F 101/16; C02F 2101/105; C02F 101/10; C02F 1/442; C02F 1/44; C02F 1/441; C02F 1/683; C02F 1/68; C02F 1/444; C02F 2101/20; C02F 101/20; C02F 11/04
USPC ....... 210/603, 615, 616, 617, 631, 903, 906, 210/912
See application file for complete search history.

(56) References Cited

U.S. PATENT DOCUMENTS

| | | | |
|---|---|---|---|
| 2013/0327709 A1* | 12/2013 | Stroot | C02F 3/006 210/605 |
| 2013/0337518 A1* | 12/2013 | Razavi-Shirazi | C02F 3/348 435/140 |
| 2014/0197103 A1 | 7/2014 | Votaw et al. | |

FOREIGN PATENT DOCUMENTS

| | | |
|---|---|---|
| JP | 2012-200696 A | * 10/2012 |
| WO | WO 2014/081737 A1 | * 5/2014 |

* cited by examiner

PROCESS FOR THE TREATMENT OF A FLOW OF WASTE WATER BY LOW-PRESSURE FILTRATION

This application is a U.S. National Stage Application of PCT Application No. PCT/FR2015/051685, with an international filing date of 23 Jun. 2015. Applicant claims priority based on French Application No. 1456040 filed 27 Jun. 2014. These applications are incorporated herein by reference in their entirety.

The invention relates to a waste water treatment allowing treated water of very high purity to be obtained, while having a moderate site coverage, in particular in terms of civil works, combined with low production of sludges generated by the treatment.

This water results from human use in a domestic, municipal or industrial context (hence the expression "waste water") and contains organic or mineral pollution that is commonly defined in particular in terms of suspended solids (abbreviation: SS), biochemical oxygen demand (abbreviation: BOD) and chemical oxygen demand (abbreviation: COD); waste water can also contain, depending on its origin, different forms of nitrogen as well as phosphates, or even heavy metals, in particular.

Currently, depollution requirements mean that waste water treatment is commonly carried out by means of a biomass, in the context of treatments known as biological.

A biomass within the meaning of the aforementioned biological processes (and in the present context) is essentially formed of living organisms, in particular bacteria, which, depending on the circumstances, are free or fixed (by extension, this concept of biomass is sometimes extended to include the pollutant load contained in the effluent to be treated, in particular the fraction thereof intended to be consumed by these living organisms). Free biomass is a biomass that develops freely in tanks into which the water to be treated is injected and in which anoxic (absence of available oxygen), anaerobic (absence of air) or aerobic (aerated environments) conditions are maintained, depending on the circumstances. Fixed biomass is a biomass which develops on supports installed within reactors containing the waste water to be treated (for example on a biofilter, a biological disk, a floating support, etc.), which can also be under anoxic, anaerobic or aerobic conditions. By the term "sludges" is meant the living microorganisms and the products released by the biomass (whether these are products generated by this biomass from the pollution consumed or from the non-consumable fraction of the incoming pollutant load).

Such biological processes commonly include pre-treatments intended to remove the largest particles (screening) or oils in suspension (deoiling). There may also be a step of primary sedimentation to remove the compounds that settle readily.

These biological processes have the drawback that they involve the utilization of large mechanical equipment, a high energy consumption for the stirring of the tanks and the aeration of the tanks in order to keep the biomass under aerobic conditions, and generate large quantities of biological sludges; added to this, these processes frequently involve the laying out of civil works over large surface areas for the construction and utilization of the biological digestion tanks, but also sedimentation tanks (frequently used in the primary phase—see above) or clarifiers (frequently used in the secondary phase at the outlet of the tanks or biological reactors making it possible to separate the treated water from the activated sludge), as well as tanks and installations for the treatment of the aforementioned sludges.

In addition, if it is desired to reuse the waste water after treatment for various possible uses, the requirements associated with these possible uses commonly involve a treatment known as tertiary (gravity filtration, i.e. using gravity, for example in the context of a sand filtration, followed by disinfection by UV or chlorine or filtration by means of membranes). For certain uses in industry (for example in the case of a requirement for pure water) or to recharge the water table, an additional treatment (quaternary) may even be necessary. It is understood that the cost of these tertiary (or even quaternary) treatments is added to that of the preceding treatments.

The invention aims to propose a process for the treatment of waste water that does not have all these drawbacks, but makes it possible to provide water of high purity, with a site coverage that is reduced as a result of the reduction in the number and the moderate size of the necessary tanks or reactors, while providing optimum upscaling of the products generated by the treatment. A supplementary aim of the invention is to minimize not only the investment cost but also the operating cost, in particular in terms of energy consumption, by profiting from the COD contained in the waste water.

More recently, various technologies have been proposed for the treatment of waste water that no longer utilize a secondary treatment of the biological or biochemical type but utilize one or more membrane filtration treatments (frequently reserved for tertiary treatment).

It may be recalled that membrane filtration treatments are conventionally divided into microfiltration, ultrafiltration, nanofiltration and reverse osmosis treatments, in an order involving increasingly thorough filtration (electrodialysis is frequently incorporated into these membrane treatments). A cutoff is commonly defined for a membrane, corresponding to the size of the particles that it is capable of retaining; thus, for a microfiltration membrane (abbreviation: MF), the cutoff can be chosen between 100 and 10,000 nanometers; for an ultrafiltration membrane (abbreviation: UF) this cutoff can be of the order of 10 nanometers (and comprised between 1 and 100 nanometers) and, for nanofiltration (abbreviation: NF) and reverse osmosis (abbreviation: RO), this cutoff can be equal to, or less than, one nanometer. It is sometimes said that a microfiltration membrane retains particles of significant size and fats, that an ultrafiltration membrane also retains compounds in colloidal form such as proteins, that a nanofiltration membrane also retains salts and finally that a reverse osmosis membrane allows almost nothing to pass except pure water (in fact, the distinction between microfiltration membranes and ultrafiltration membranes is not always completely clear). Taking account of the cutoffs currently considered, microfiltration or ultrafiltration membranes may be considered as being porous membranes, while nanofiltration or reverse osmosis membranes are at most permeable or semi-permeable. Another difference between these pairs of membranes is that the microfiltration or ultrafiltration treatments are carried out with a differential pressure (between the two faces of the membranes) which is low, typically of the order of one bar, for example from 0.2 bar to 2, or even 5 bar, while the nanofiltration or reverse osmosis treatments involve much higher differential pressures, typically comprised between 5 bar and 20 bar. It is thus understood that these membrane treatments involve a high energy consumption which has for a long time curbed their development.

It has sometimes been proposed to subject an effluent to be treated to a membrane filtration treatment combined with a biological treatment; thus a membrane bioreactor is sometimes mentioned (with a submerged membrane or one combined with a reactor containing a biomass). In this regard mention may be made of the document "Design of Municipal Wastewater Treatment Plants", WEF Manual of Practice No. 8, ASCE Manuals and Reports on Engineering Practice No. 76, Fifth Edition, "Membrane processes", pp. 16-119 to 16-150, 2010. Similarly, reference is made in the document "Wastewater Engineering, Treatment and Reuse, Fourth Edition, Metcalf & Eddy, Inc, McGraw Hill, membrane filtration processes, pp. 1104-1137, 2003. Reference may also be made to the document "Evaluation of Economic Viability and Benefits of Urban Water Reuse and its Contribution to Sustainable Development" by Lazarova, Rougé, Sturny and Arcangeli, in Water Practice & Technology, Vol. 1, No. 2 2006. Other documents focus on the contribution of a reverse osmosis process as a complement to secondary treatments of different types (see for example the thesis by Anna Kieniewicz, AP/KTH "A reverse osmosis (RO) plant for sewage treatment and nutrient recovery—the influence of pre-treatment methods", R nr. 17, oktober 2006, Vatten—ISSN 1651-064X).

Most particular attention has been paid to the possible complementary role that may exist between a first stage of microfiltration or ultrafiltration and a stage of nanofiltration, or even reverse osmosis. In particular, a pilot installation was constructed and commissioned, under the acronym of IMANS™ for "Integrated Membrane ANaerobic Stabilization System", without secondary treatment. In this respect reference may be made to an article, "Closing the Gap—Reaching for Energy Independency in Water Reclamation", by Graham Juby, P. E, Jul. 27, 2012, TACWA (Texas Association of Clean Water Agencies). Such an installation utilizes, as primary treatment, a sedimentation generating sludges which are injected into an anaerobic digester (thus with no added air, thus without consumption of energy), which produces biogas from these sludges. This biogas constitutes an energy production which achieves the result that the energy balance of the installation corresponds to an overall energy consumption that remains moderate in relation to the actual consumption of the successive stages of membrane filtration. Thus this is in fact a biological treatment combined with membrane filtration treatments, but this biological treatment is applied to the treatment of the sludges originating from the primary treatment and to the concentrates originating from the low-pressure (MF) and high-pressure (NF or RO) membrane treatments and is not applied to the water during treatment.

The invention aims to allow improved operation of at least one membrane filtration stage, for example a stage of microfiltration or of ultrafiltration, receiving a flow of raw water to be treated that has undergone at most a conventional pre-treatment for removal of particles by screening/degritting or deoiling (without primary sedimentation). It aims to allow in particular a reduction in the clogging capacity of the pollutants contained in the flow of water to be treated, for example in relation to the components capable of precipitating on the membrane, while still increasing the concentration of the sludges to be filtered across the membranes without risking degrading the efficiency of an optional complementary stage of membrane filtration.

It may be noted that in order to increase the concentration of the sludges originating from the concentrate and thus the sludges separated at the level of the membranes, it is necessary to reduce the purge rate or increase the conversion rate, which is not possible unless the flow to be filtered is not too clogging.

To this end, the invention proposes a process for the treatment of a flow of waste water, according to which there is applied to this flow, after at most an optional pre-treatment of screening/degritting or deoiling, a filtration treatment by means of microfiltration or ultrafiltration membranes, by causing the flow to circulate across the membranes at a velocity of at least 0.1 m/s, in the presence of an organic sequestering agent composed based on organic phosphonates at a concentration that is effective for sequestering metal ions contained in the flow and minimizing the formation of calcium carbonate, with a differential pressure on either side of the membranes that is less than or equal to 5 bar.

Thus the invention teaches to circulate the flows to be treated (after at most a coarse pre-treatment) along the microfiltration or ultrafiltration membranes, thus membranes having a cutoff greater than or equal to 10 nanometers, with a tangential velocity of at least 0.1 m/s, which contributes to preventing the formation of deposits capable of reducing the cutoff of the membranes. Moreover, the invention teaches that when it circulates along the membranes, the flow contains an effective quantity of an organic sequestering agent constituted by organic phosphonates for chelating metal ions while minimizing the formation of calcium carbonates (or even calcium sulphates or fluorides). This effective quantity is advantageously comprised between 0.25 mg/L and 3.75 mg/L, or even 4 mg/L of organic phosphonates.

In fact, using organic phosphonates for the efficient operation of filtration membranes is already known per se, in the case of nanofiltration or reverse osmosis membranes, for protecting them against scaling in the production of drinking water; thus a compound known by the name "Hydrex 4101" was the subject of an authorization by the Agence Française de Sécurité Sanitaire de Aliments (AFSSA) [French food safety agency] for the protection of such membranes "used in treatment systems for water intended for human consumption", due to its formulation based on phosphonates (at a content of 25%), making it possible to combat the phenomena of clogging in nanofiltration and reverse osmosis membranes. It follows from this that the use according to the invention of an organic sequestering agent based on organic phosphonates upstream of at least one microfiltration or ultrafiltration membrane utilizes phenomena that are fundamentally different from those involved in the case of such a sequestering agent before nanofiltration or reverse osmosis membranes.

More specifically, the flow of water to be treated moving along a microfiltration or ultrafiltration membrane contains a much larger variety of elements than water moving along a nanofiltration or reverse osmosis membrane after a thorough prior treatment; thus it may be expected that clogging of the microfiltration or ultrafiltration membranes would occur due to compounds in the particulate or colloidal form, while these compounds are no longer present in a flow circulating close to nanofiltration or reverse osmosis membranes, so that the problem of minimizing the clogging of MF or UF membranes is very different from the problem of minimizing the clogging of NF or RO membranes, etc.

The use of phosphonates in order to avoid the clogging of nanofiltration or reverse osmosis membranes was also proposed in the document WO—2009/130324 in which the technical problem to be solved relates to the reduction of the concentration of the phosphonates contained in the sludges extracted from a membrane area of the NF or RO type (after a pre-treatment area that may contain a membrane area of the MF or UF type).

The advantages noted during the use, known per se, of phosphonates upstream of nanofiltration and reverse osmosis membranes in no way allowed the assumption that this use could have the least benefit upstream of microfiltration or ultrafiltration membranes preceded at most by a coarse treatment.

- Phosphonates are in fact molecules that are known for a tendency to adsorb on suspended solids and even more so on particles contained in the flow to be treated; consequently, there was every reason to assume that an injection of phosphonates upstream of microfiltration or ultrafiltration membranes would have no effect on a flow still containing particulate or colloidal pollutants,
- On the contrary, such an injection of phosphonates into the flow to be treated by filtration on microfiltration or ultrafiltration membranes could at the most only have the effect that it has when it is injected upstream of nanofiltration or reverse osmosis membranes (in the absence of particles, colloids or suspended solids), namely of sequestering the calcium ions and chelating the minerals and metals, so as to prevent them from precipitating on the membranes, by thus allowing them to pass through these membranes, at the risk of clogging any subsequent membranes,
- In any event, such an injection had no chance of promoting densification of the sludges retained by microfiltration or ultrafiltration membranes without the risk of clogging these membranes.

Completely unexpectedly, it was found that the injection of organic phosphonates into a flow to be treated by filtration on microfiltration or ultrafiltration membranes brought into play two concurrent phenomena the respective kinetics of which allowed the technical problem in question to be solved;

- The most rapid phenomenon was the tendency of the phosphates to sequester calcium ions or to chelate minerals or metals,
- Also, even after having thus sequestered or chelated compounds from the flow to be treated that would have risked contributing to clogging of the membranes, these phosphonates retain their tendency to adsorb on the particles, colloids or suspended solids, with kinetics still sufficiently rapid to take place before the sequestered or chelated compounds have passed through the membrane.

In other words, contrary to expectations, the presence of suspended solids or colloidal or particulate materials before a microfiltration or ultrafiltration membrane makes it possible to use the synergy of the possible effects of the phosphonates to remove the compounds capable of being chelated or sequestered and to adsorb them immediately on the suspended solids in the flow to be treated in order to densify the sludges and prevent the chelated or sequestered compounds from passing through the membranes.

Thus the use of organic phosphonates upstream of microfiltration or ultrafiltration membranes is entirely novel because, while limiting the clogging of the membranes, it makes it possible to efficiently remove a portion of the calcium (and minerals or metals) present in the flow to be treated.

Also, since these phosphonates are adsorbed on the sludges, they are efficiently separated from the filtered effluent, while their biological treatment before their discharge into the natural environment is specifically promoted by the high conversion rate of the membranes (linked to the high concentration of the sludges that these phosphonates promote).

Entirely unexpectedly, it was found that an injection of organic phosphonates into a flow to be treated that has at most only undergone a coarse treatment provided a solution to the technical problem consisting of preventing the clogging of low-pressure (microfiltration or ultrafiltration) membranes.

In any event, it was found that, by causing a flow of waste water to circulate at a sufficiently high velocity, the risks of clogging were even further reduced, while still generating an acceptable quantity of sludges, to the extent of not requiring cleaning of the membranes at a frequency greater than once a day, or even once every 3 to 10 days.

According to advantageous features of the invention, optionally in combination:

- the addition of the sequestering agent promotes the capture of metal ions, prevents the precipitation of calcium carbonate and promotes the filtration of water through the pores of the membrane,
- a second filtration treatment is then applied by means of nanofiltration or reverse osmosis membranes,
- sludges generated during the filtration treatment by means of microfiltration or ultrafiltration membranes are removed and are injected into an anaerobic biological reactor so as to form a biogas therein which is recovered,
- the biogas produced is converted into energy that can be reused on site,
- the anaerobic reactor is coupled with a biological reactor constituted by fixed bacteria which makes it possible to remove the nitrogen produced in said anaerobic reactor,
- the biological reactor with fixed bacteria is a moving bed bioreactor or MBBR which combines nitration and anoxic oxidation of ammonia via the development of a biofilm on a plastic support moved by agitation or aeration.
- the concentrate produced by the nanofiltration or reverse osmosis membranes is directed to an anaerobic biological reactor in order to produce biogas therein.

Subjects, features and advantages of the invention will become apparent from the following description, given by way of illustrative, non-limitative example, with reference to the attached drawings in which:

FIG. 1 is a functional diagram of a waste water treatment installation implementing a version of the process of the invention.

Figure 2:
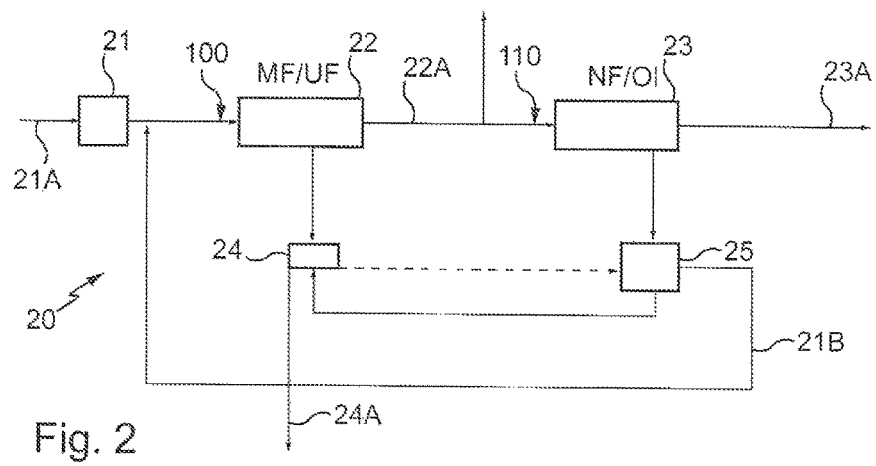
Figure 3:
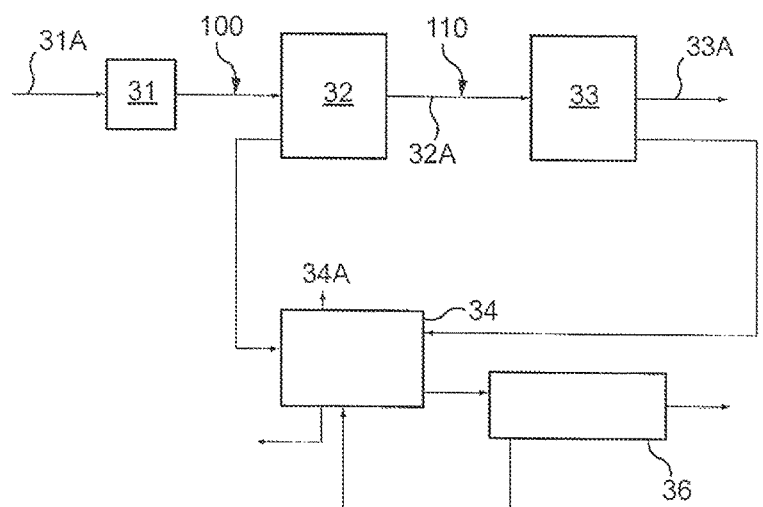
Figure 4:
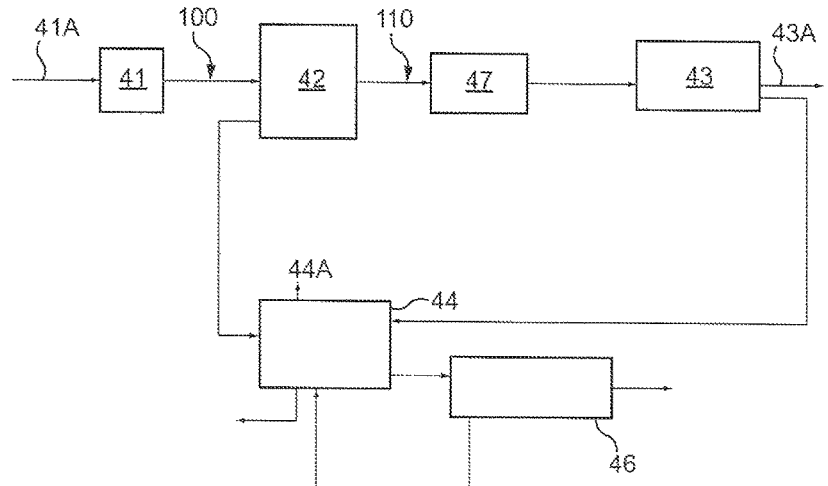
Figure 5:
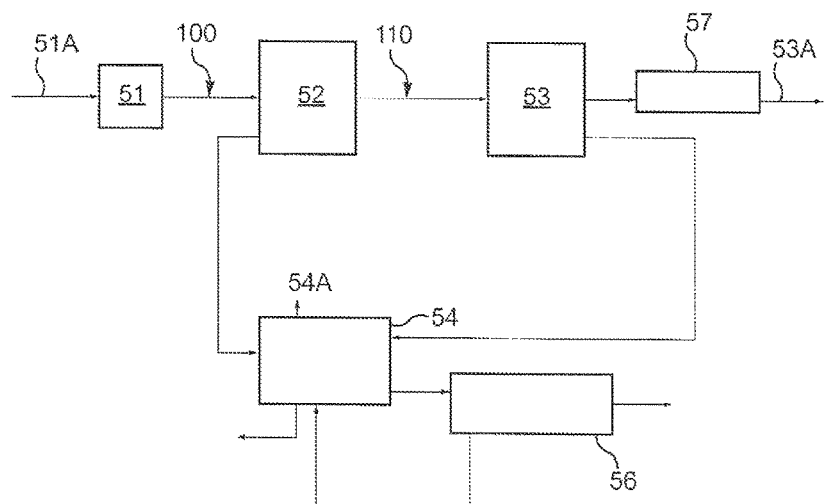

FIG. 2 is a functional diagram of a more complete example of an installation for the implementation of the process, FIG. 3 is a functional diagram of another example of an installation for the implementation of the process, FIG. 4 is a functional diagram of a variant of this other example of an installation for the implementation of the process, and FIG. 5 is a functional diagram of another variant of this other example of an installation for the implementation of the process.

In a particularly simple example of an implementation of the invention, an installation denoted by the reference 10 contains a pre-treatment area 11 and an area for concentration by filtration 12. A raw effluent to be treated is conveyed into the pre-treatment area by a supply pipeline 11A and a treated effluent is output via an outlet pipeline 12A.

In such a version, the treated effluent 12A can be usable in agricultural applications; however, preferably, this treated effluent (or at least a portion of this effluent) is applied to the inlet of a high-pressure filtration area 13, from which is output, via a pipeline 13A, an effluent of better quality than the effluent of the pipeline 12A.

The area of concentration by filtration contains a plurality of microfiltration or ultrafiltration membranes, i.e. filtration membranes of which the cutoff is at least equal in practice to 10 nanometers.

The process implemented by such an installation contains, for the treatment of a flow of waste water, the following steps:

A limited pre-treatment is applied to this flow, containing at most a treatment for the removal of the largest suspended solids (by screening/degritting or deoiling), A filtration treatment is applied to this pre-treated effluent by means of microfiltration or ultrafiltration membranes, making the flow circulate tangentially to the membranes at a velocity of at least 0.1 m/s or even 0.3 m/s (preferably 0.5 m/s) in the presence of an organic sequestering agent composed based on organic phosphonate, in order to obtain typically a concentration of 0.25 mg/L to 4 mg/L (or preferably not more than 3.75 mg/L), which has been found to be an effective concentration for sequestering metal ions contained in the flow and minimizing the formation of calcium carbonate, with a differential pressure on either side of the membranes that is less than or equal to 5 bar.

It is noted that, when membrane filtration is carried out with tangential flow, which is the case in particular in low-pressure membrane filtration processes, the current of effluent to be treated (inlet current) does not pass through the membranes in its entirety; in practice, this current is divided into two output currents, namely the permeate which has passed through the membranes via the pores thereof and the concentrate which is discharged. In order to increase the tangential flow rate and thus the sweeping of the surface of the membrane, it is advantageous for the concentrate to be partially, or even entirely, recycled upstream of the membrane unit, by means of a recycle loop. This loop, which is standard in the case of tangential flow filtration, is generally not shown. Thus it is not shown in the figures.

The addition of the sequestering agent promotes the capture of metal ions, prevents the precipitation of calcium carbonate and promotes the filtration of water through the pores of the membrane.

When present, the area 13 makes it possible to apply to the effluent treated in area 12 a filtration treatment on nanofiltration or reverse osmosis membranes.

The sequestering agent is for example constituted by the compound marketed under the name Hydrex 4101 at a concentration of 1-15 mg/L (it contains 25% phosphonates), which corresponds to the aforementioned concentration of 0.25 mg/L to 3.75 mg/L of organic phosphonates. This compound is formed of a mixture of phosphonic acids, more precisely of ATMP (amino tris(methylenephosphonic acid) and HDTMP (hexamethylenediamine tetra(methylene phosphonic acid).

It is to be noted that this is a sequestering agent with a high potential, in the sense that one molecule is sufficient to maintain in solution several thousand molecules (in particular calcium molecules) capable of precipitating. It is also capable of sequestering metal ions by chelation, in particular heavy metal ions.

Although the phosphonates are known to have a tendency to adsorb at the surface of suspended solids, in particular on sludges (when present), the fact of injecting them with the effluent only just pre-treated in the area 12 makes it possible to densify the sludges while minimizing the precipitation of the elements contained in the effluent. The injection of these phosphonates is shown diagrammatically by the arrow 100; this injection can be done before the area 12 or in this area. In fact, it was found that these phosphonates first cause a sequestration or a chelation of calcium compounds, minerals or metals, before adsorbing on the suspended solids and on the particles or colloids. Generally, the higher the conversion rate, the more concentrated the fluid to be treated and the more difficult the filtration through the membrane, with a risk of clogging of the membranes; however, according to the invention, the phosphonates make it possible to limit the fouling capacity of the water to be treated and thus make it possible to increase the conversion rate. Also, any excess of phosphonates will be able to be removed with the sludges; once adsorbed, these phosphonates remain fixed to their support in a durable manner, which limits considerably the associated risks for the environment; removal of the organic phosphonates can be done subsequently, during an optional anaerobic biological treatment of the concentrate (this is a particularly beneficial option).

FIG. 2 shows an example of an installation allowing the invention to be implemented.

This installation, denoted by the reference 20, contains areas which, being similar to areas in FIG. 1, are denoted by numbers derived from the references in said FIG. 1 by the addition of the number 10, with the exception that the injection of organic phosphonates is still denoted by the arrow 100. Thus, this installation 20 contains a supply channel 21A for raw effluent to be treated which terminates in a pre-treatment area 21 where, if useful, removal of the largest particles in suspension takes place (by screening/degritting or by deoiling); the outlet from this area 21 is connected to the inlet of a filtration area 22 containing microfiltration MF or ultrafiltration UF membranes, with a cutoff that in practice is greater than or equal to 10 nanometers. The filtered effluent is output from this area 22 via a channel 22A which, if desired, allows use without any other treatment (for example in an agricultural environment).

This installation contains moreover a supplementary filtration area 23, containing filtration membranes that have cutoffs lower than those of the membranes of the area 22; these are advantageously nanofiltration NF or reverse osmosis RO membranes. A very pure effluent is output via a channel 23A.

In the installation of FIG. 2, an anaerobic digestion treatment area 24 is provided to collect the sludges formed in the area for concentration by filtration 22; via this biological treatment, biogas is obtained which, output via the channel 24A, can be upscaled; by way of preferred example, this biogas serves as a source of energy for the operation of the membranes, such as for example maintaining the required differential pressures.

Similarly, the sludges formed in the second filtration area (although in much smaller quantities than in area 22) can also be conveyed to a biological treatment area 25, which can be merged with the area 24, or the sludges of which can be sent to the area 24 while a return channel is provided from this area 24 to the area 25 in order to convey thereto the effluent clarified in the area 24. Advantageously, the effluent clarified in one or both of the areas 24 and 25 is re-injected into the pre-treatment area, or close to the latter, here via the channel 21B, which makes it possible to have a single outlet channel for the purified effluent. The non-digested sludges are discharged (via a channel not shown here).

Advantageously, the passage of the effluent originating from the concentration area into the area 23 takes place in the presence of an addition of sequestering agent (shown diagrammatically by an arrow 110), preferably identical to that used in the area 22, i.e. a component based on organic phosphonates; the concentration of these phosphonates can be comprised between one and two thirds of the concentration used in the area 22.

In a simplified version, the installation can contain only a low-pressure filtration stage and the digestion reactor, without a second filtration stage.

A treatment system according to the invention of FIG. 2 thus contains, in general terms:

- A step of pre-concentration of the raw water on an organic or mineral membrane (in 22),
- A step of complementary treatment using nanofiltration or reverse osmosis membranes (in 23)
- Optional intermediate treatment for removal of the phosphates and nitrogen-containing compounds (see FIG. 4 below)
- A treatment of the concentrates originating from these two steps by digestion (solid concentrate or liquids, in 24 and/or 25) or in a small conventional biological treatment unit or, as a variant, by a process which contains biological treatment steps using specific anaerobic ammonium oxidation bacteria, abbreviation: "anammox", which develop on a media incorporated in the biological reactor. These bacteria have the advantage of converting a portion of the ammonia into gaseous nitrogen without passing through the nitrates stage. They thus make it possible to reduce the consumption of O2 by approximately 30%, which results in a substantial reduction of energy (due to the reduction in aeration). They also make it possible to reduce the demand for an external carbon source
- Upscaling of the by-products (channel 24A).

Such an installation is for example composed of a membrane module containing 108 tubes with a diameter of 5.2 mm and a length of 3 m for a total surface area of 5 $m^2$. These membranes were formed from PVDF (polyvinylidene fluoride), with a cutoff of 30 nm. Before reaching the membrane, the waste water passed through a screen, the apertures of which had an equivalent diameter of 1 mm.

Of course, the installation could have been formed of a different number of membrane modules, with different diameters and lengths. Preferably, the diameter of the tubes is chosen within the range of 2 to 20 mm.

Clogging was controlled by causing the solution to be treated to circulate parallel to the membrane; this tangential circulation created a shear stress close to the membrane, which limits the accumulation of the retained particles. Under the action of a pressure gradient, the solution to be treated divides at the level of the membrane into two flows of different compositions, namely the one that passes through the membrane, or permeate, and the one that is retained by the membrane, called concentrate or retentate.

This circulation is a dimensioning element, the velocity across the membrane being required according to the invention to be a minimum of 0.1 m/s, or even 1 m/s, or even at least 2 m/s.

With these conditions and a volume concentration factor of 3.33, i.e. a conversion rate of at least greater than 70%, the flow through the membrane made it possible to have a cost-effective process. The flow was greater than 30 L/·$m^2$·h, also denoted LMH (liters per square meter per hour), or even greater than 40 LMH for a transmembrane pressure of 0.5 bar (this is in fact the existing differential pressure between the two faces of the membrane).

The pre-treated waste water was introduced into the area 22, in order to feed the membrane at a constant flow rate (approximately 17 $m^3$/h so as to ensure the desired velocity, here of 2 m/s). The permeate (approximately 200 L/h, i.e. approximately 40 LMH) was discharged and the concentrate was recycled to the supply tank; the purge rate of the concentrate was calculated so as to simulate the desired conversion rate (filtration in the "feed and bleed" mode).

As a result of the implementation of a simple or chemical backwashing, it was possible to maintain the flow over time. In order to avoid the precipitation of some species, it was possible to add acid as a complement to the sequestering agent at the head of the membrane (either in the tank or in the piping conveying the effluent).

With a pH adjusted to 7.6 and an injection of the compound Hydrex 4101 at a concentration of 10 mg/l, a conversion rate of 80% was observed (i.e. a volume concentration factor of 5) with the intended velocity of 2 m/s across the membrane.

Controlling the clogging at an acceptable level was carried out by adding sequestering agents (which, apart from the aforementioned effect, made it possible to reduce the addition of acid); at a pH adjusted to 7.6 it is possible to reduce the addition of acid very significantly.

With a conversion rate of 50%, it was possible to maintain a level of 50 LMH, with 1 CEB/day in the presence of 0.6 ppm of sequestering agent Hydrex 4101, with 1 CEB every 2-3 days with 1 ppm of this sequestering agent, or 1 CEB every 7 to 10 days with 10 ppm; it is possible to deduce therefrom the preferred range of 1-10 ppm of sequestering agent. (CEB denoting Chemical Enhanced Backwash (for clarification: by chemical backwash is meant the injection of a cleaning solution in the reverse direction to the filtration))

By way of example, the following measurements were obtained:

|  | Screened water | Concentrate | Permeate |
| --- | --- | --- | --- |
| tCOD (mg/l) unfiltered | 654 | 2054 | 142 |
| sCOD (mg/l) filtration at 0.45 micrometres | 199 | 241 | 135 |
| SS g/l | 0.25 | 0.99 | 0.03 |
| SS g/l | 0.80 | 1.73 | 0.53 |
| N—NH4 mg/l filtered at 0.45 micrometres | 41 | 48 | 48 |
| TP mg/l unfiltered | 26 | 59 | 16 |
| P—PO4 mg/l filtered at 0.45 micrometres | 13.20 | 18 | 13.20 |
| SO4-mg/l filtered at 0.45 micrometres | 70 | 87 | 69 |
| c/sFe mg/l unfiltered | 4.3 | 10.7 | 0.2 |
| sFe mg/l filtered at 0.45 micrometres | 0.30 | 0.53 | 0.19 |
| pH | 8.15 | 7.55 | 7.8 |
| Turbidity NTU | 186 | 760 | 0.6 |

The biogas originating from the methanization of the organic "concentrates" (or "retentates") is output from the methanizers such as 24 or 25 in a water-saturated state (several percent by volume). After drying, it is composed essentially of methane (60 to 65% by volume), of carbon dioxide (30 to 40%) and minor gases (hydrogen, nitrogen, etc.) including hydrogen sulphide at the rate of several tens to several thousands of ppm.

This gas can be used to produce electricity and heat, jointly or not, which can be used for the needs of the industrial installation. The use and energy upscaling of the biogas is the production of heat in a boiler, and combined heat and power generation supplies electricity with an electricity yield of 35 to 41% (i.e. 2.2 to 2.5 kWh electricity produced per $Nm^3$ of biogas).

Thus various solutions for upscaling of the biogas are:
Upscaling of heat in situ in a boiler (yield greater than 85%)
Combined heat and power generation (yield of 42% heat and 38% electricity).

The biogas can serve as a fuel for a steam boiler and combustion is ensured by means of burners incorporated into boilers provided with stainless steel combustion chambers that produce high-temperature, high-pressure steam. Water in a closed circuit is heated by these boilers and the dry steam created is then directed towards a turbine linked to an alternator which converts the mechanical energy into electrical energy, the steam is then condensed (by an aero-condenser) and returns to the liquid state (at 135° C.).

A simulation was carried out in the context of a waste water treatment system of 100,000 PE (i.e. population equivalent), assuming a standard water with an average standard pollution by COD, BOD, SS, NK and total phosphorus; the flow rate for treatment was 25,000 $m^3$/d. The production of sludges originating from the pre-concentration (10,300 kg of suspended solids per day) was estimated as a function of pilot tests carried out and from the yields obtained, in particular of reduction of the particulate pollution (99%). This production of sludges rich in volatile organic materials, thus with the potential to generate methane (production of biogas), is a source of energy coupled with a methanization process.

In the knowledge that a UF (ultrafiltration unit) consumes approximately 1 $kWh/m^3$ of water to be treated, digestion alone of the 10,300 kg SS/d makes it possible to cover approximately 20% of the energy requirements of the ultrafiltration by a combined heat and power generation engine.

A supply of external materials (organic materials that are readily biodegradable such as food waste, biodegradable industrial waste, etc.) feeding the digester makes it possible to increase the quantity of biogas produced that can be upscaled to energy. This co-digestion then makes it possible to cover all of the energy requirements of the ultrafiltration.

In the case of a global system including double membrane filtration (UF and reverse osmosis), resulting in a better quality of water for various municipal and industrial applications, the concentrates from the reverse osmosis combined with the external sludges (co-digestion) make it possible to cover of the order of one half of the needs of the whole of the installation (bearing in mind that the energy demand for a reverse osmosis unit is situated around 1.8 $kWh/m^3$ of water to be treated).

This solution of direct pre-treatment with a UF unit, and its energy optimization, is distinguished from the conventional systems of the type activated sludge/clarification/UF membranes (consumption of the order of 1.3 $kWh/m^3$) and membrane reactor (0.7 $kWh/m^3$). However, although the energy demand of the membrane reactor seems lower, nevertheless it is more difficult to cover, as the sludges originating from such a reactor are more mineral (stabilized as a result of a high age of the sludges), unlike the primary sludges originating from the UF unit which are less mineral but highly loaded with upscalable organic materials. In addition, the systems with a reactor with membranes involve a large floor area, a tank for activated sludge (thus costly civil works as well as maintenance of the equipment), which would demonstrate that this solution is more complex to operate and to implement than a direct treatment on a UF unit.

A conventional biological treatment makes it possible to treat the particulate and dissolved pollutants at the rate of approximately 90%, which means that the concentrations of the discharges of the different substances initially present in the waste water would be 30 mg/l of SS, 90 mg/l of COD, 30 mg/l of biological oxygen demand (BOD5), 15 mg/l total nitrogen (TN) and 2 mg/l total phosphorus (TP). Under these conditions the water treated according to this conventional system cannot be reused directly.

The reuse of this water for an improvement in the quality of the water for agricultural purposes requires a complementary treatment which would involve a filtration over sand with UV and/or chlorination, a mechanical filtration with UV and/or chlorination or a membrane filtration (MF or UF); this latter step makes it possible to remove a quantity of microorganisms at the rate of 5-6 log, which is not possible for the conventional treatments or the additional treatments such as gravity filtration or mechanical filtration.

The reuse of this water for a significant improvement in the quality of the water for the purposes of industrial processes, re-charging water tables, as indirect drinking water, etc. requires the addition, after the first step of membrane treatment (MF or UF), of a second step of reverse osmosis treatment or of nanofiltration treatment, because this step makes it possible to remove both the dissolved substances and the salts present in the water.

FIGS. 3 to 5 show possible options.

Thus FIG. 3 repeats the main content of the example in FIG. 2 (similar elements are denoted therein by reference numbers derived from those in said FIG. 2 by the addition of the number 10), with a single digester 34 for the treatment (in an anaerobic environment) of the "retentates" or "concentrates" of the two filtration areas 32 and 33, with the application of a biological treatment (in 36) to the effluent output from the digester and return of the sludges from the biological area to this digester; the outlet of this biological area 36 is independent of the outlet of the high-pressure filtration area 33. As previously, the biogas recovered during the anaerobic treatment can be converted into energy.

FIG. 4 represents another variant of the example in FIG. 2 (similar elements are denoted therein by reference numbers derived from those in said FIG. 2 by the addition of the number 20), with a single digester 44 for the treatment (in an anaerobic environment) of the "concentrates" or "retentates" of the two filtration areas 42 and 43, with the application of a biological treatment (in 46) to the effluent output from the digester and return of the sludges from the biological area to this digester; the outlet of this biological area 46 is independent of the outlet of the high-pressure filtration area 43. As previously, the biogas recovered during the anaerobic treatment can be converted into energy. Unlike the installation in FIG. 3, this installation contains an area 47 of complementary treatment, between the filtration areas 42 and 43, for example for a physico-chemical treatment allowing the recovery of phosphorus.

Finally, FIG. 5 shows a variant of the installation in FIG. 2 (similar elements are denoted therein by reference numbers derived from those in said FIG. 2 by the addition of the number 30), with a single digester 54 for the treatment (in an anaerobic environment) of the "concentrates" or "retentates" of the two filtration areas 52 and 53, with the application of a biological treatment (in 56) to the effluent output from the digester and return of the sludges from the biological area to this digester; the outlet of this biological area 56 is independent of the outlet of the high-pressure filtration area 53. As previously, the biogas recovered during the anaerobic treatment can be converted into energy. Unlike the installation in FIG. 4, this installation contains an area of complementary treatment 57, not between the filtration areas, but after the high-pressure filtration area, here constituted by a treatment area intended to remove ammonia by stripping, which consists of degassing the ammonia from the water by a physical process at basic pH.

It will be easily understood that many other variants may be envisaged; these figures having the common purpose of proposing examples of a treatment system according to the invention that contain:

A first pre-treatment step that can include screening-degritting-deoiling, combined or not with microscreening or any other pre-treatment so as to remove the mineral particles (in particular, sand), as well as the fats and oils contained in the incoming flow of waste water.

A second step, consisting of a direct treatment on organic or ceramic low-pressure membranes, so as to retain all the suspended solids (SS) and deliver an intermediate effluent practically free of SS and organic pollutants, particulate or colloidal; effective decontamination of the microorganisms is also associated with this step of treatment. This water can be directly used in agriculture, or as industrial water for various urban applications, or even be discharged into a receiving environment (sensitive or conventional).

A third step includes a complementary treatment of the water output from the second step, by passing it over reverse osmosis or nanofiltration membranes. This step makes it possible to remove the organic and mineral soluble compounds. Thus water is obtained from which these pollutants have been removed and which can then be used for recharging water tables, as an industrial water for sensitive processes (microelectronics, foodstuffs, paper production, etc.), for use as urban industrial water, or even as drinking water under certain conditions of use.

Account can also be taken of the following:

The concentrate originating from the second step, mainly constituted by SS and particulate and/or colloidal organic pollutants is directed to a digestion step so as to produce biogas, Depending on the quality of the inflowing waste water, an intermediate step can be provided between the second step and the third step in order to treat particular pollutants such as phosphorus or nitrogen, The liquid concentrate originating from the third step, mainly constituted by organic and mineral substances is also directed to a small biological treatment unit so as to reduce the pollution that is concentrated therein: the sludges produced in this biological unit are also directed to the digester so as to reduce the organic content thereof and to produce biogas, The biological and mineral sludges originating from this biological treatment unit can thus be upscaled in order to produce energy (biogas), allow an upscaling of by-products such as the production of struvite, bioplastics or also organic substances that can be reused in this unit by way of a source of organic carbon.

The first step consists of a conventional pre-treatment, by which the incoming flow undergoes screening, degritting and/or deoiling, so as to extract therefrom the largest particles.

The second step consists of subjecting the flow thus pre-treated to a membrane filtration by means of microfiltration or ultrafiltration membranes; these membranes can be of the organic or mineral type (for example made from ceramic). This second step can be carried out with the following operating conditions:

Incoming flow of 40 $l/m^2/h$ to 200 $l/m^2/h$;

Conversion rate capable of reaching 50% à 85%,

Cleaning of the membranes can be provided using chlorine, soda or acid with a frequency that is dependent on the operating conditions, between once a day and once a week;

An intermediate treatment can be provided in order to extract, for example, phosphorus, using physico-chemical phenomena such as, for example, precipitation; this intermediate treatment can also be intended to extract ammonia nitrogen, for example by stripping.

A third step consists of refining the treatment by means of nanofiltration or reverse osmosis membranes so as to remove the organic and mineral pollution; the applicable flows range from 15 $l/m^2/h$ to 35 $l/m^2/h$, with a conversion rate of 70% to 90%; cleaning can be carried out using chlorine, soda or acid with a frequency that is dependent on the operating conditions, between once a day and once a week.

In parallel, the solid concentrate is treated by digestion and upscaling of the biogas produced, while the liquid concentrate is treated in a small biological unit; the biological treatment units make use of the techniques currently in use (activated sludges, biofilters, moving bed bioreactor (MBBR—see above), membrane bioreactors MBR, upflow anaerobic digesters UASB, etc.) and according to the current dimensioning methods.

The by-products can then be upscaled (biogas, struvite, bioplastics, etc.).

It will be understood that the invention presents various advantages compared with the current solutions:

it is a physical process that is simpler to operate than a biological process, this system is not very sensitive to variations in loads or temperature, the quality of the treated water is constant regardless of the quality of the raw water, improvement in the quality of the water produced in each treatment step with a possibility of direct reuse for various applications (agriculture, industries, direct or indirect drinking water), reduction in the site coverage, reduction of the biological treatment installation in comparison with a conventional unit, reduction in the energy costs linked to the systems for aeration, stirring and recycling of the sludges, reduction in the production of sludge linked to the biological treatment, increase in the capture of COD contained in the waste water for conversion into methane, reduction in the CO2 emissions over the biological stage compared with a conventional system, modulable membrane treatment system applicable as a function of the final water quality required, modulable membrane treatment system applicable as a function of the specific uses required for the treated water, there is no problem with odours (odour treatment limited to a few facilities).

It is to be noted that the invention makes it possible to considerably reduce the doses of sequestering agent to be injected upstream of an optional area for filtration by reverse osmosis or nanofiltration, due to the fact of injecting said sequestering agent before the low-pressure filtration membranes.

In fact, the dose of sequestering agent injected upstream of the first (low-pressure) filtration area is greater than the dose subsequently injected, upstream of the second (high-pressure) filtration area.

Surprisingly, it was found that the hydraulic performance of the membranes was better when the content of the suspended solids (SS) in the recycle loop was increased (see the explanation given with respect to the tangential flow membrane filtration).

Thus, monitoring of the flow (corrected to 20° C., measured in liters per hour and square meters) through the membranes and the SS content in the recycle loop (measured in ppm) over several days showed that for values of 0.70 to 0.75 of the SS content, there was a flow of 40-45, but that a decrease in the SS to 0.50-0.55 was accompanied by a decrease of the flow to approximately 30. It can therefore be assumed that it is by making it possible to maintain high SS contents and dense sludges in the recycle loop the sequestering agent improves the filtration performance.

It is interesting to note that the effect of the densification of the sludges provided by the sequestering agent, as a complement to its effect of minimizing clogging, also has the positive effect of improving the biogas production yield in the gasification reactor. Such advantages are observed even in the absence of a second filtration stage.

The invention claimed is:

1. A method of treating water comprising:
    pre-treating the water;
    after pre-treating the water, directing the water to and through one or more microfiltration or ultrafiltration membranes and producing a first permeate and a first concentrate;
    flowing the water tangentially to the microfiltration or ultrafiltration membranes at a velocity of at least 0.1 m/s;
    mixing an organic sequestering agent with the water at or upstream of the microfiltration or ultrafiltration membranes and wherein the sequestering agent comprises organic phosphonates;
    mixing a sufficient amount of organic phosphonates with the water to achieve a concentration that is effective for sequestering metal ions contained in the water and minimizing the formation of calcium carbonate;
    after sequestering the metal ions and minimizing the formation of calcium carbonate, adsorbing the organic phosphonates onto the suspended solids in the water;
    maintaining a differential pressure across the microfiltration or ultrafiltration membranes that is less than or equal to 5 bar;
    directing the first permeate to and through one or more nanofiltration or reverse osmosis membranes to produce a second permeate and a second concentrate;
    directing the first concentrate to a first anaerobic digester and anaerobically digesting the first concentrate; and
    directing the second concentrate to the first anaerobic digester or to a second anaerobic digester and anaerobically digesting the second concentrate.

2. The method of claim 1 including maintaining the concentration of organic phosphonate in the water flowing across the microfiltration or ultrafiltration membranes at 0.25 mg/L to 4 mg/L.

3. The method of claim 2 wherein there is provided a biological reactor operatively connected to at least one of said anaerobic digesters and which includes fixed bacteria and wherein the method includes removing nitrogen produced in the anaerobic digester from the concentrate therein.

4. A method of treating water containing suspended solids and metal ions comprising:
    pre-treating the water;
    after pre-treating the water, directing the water to and through one or more microfiltration or ultrafiltration membranes and producing a first permeate and a first concentrate;
    flowing the water tangentially to the microfiltration or ultrafiltration membranes at a velocity of at least 0.1 m/s;
    mixing an organic sequestering agent with the water at or upstream of the microfiltration or ultrafiltration membranes and wherein the sequestering agent comprises organic phosphonates;
    mixing a sufficient amount of organic phosphonates with the water to achieve a concentration that is effective for sequestering metal ions contained in the water and minimizing the formation of calcium carbonate;
    after sequestering the metal ions and minimizing the formation of calcium carbonate, adsorbing the organic phosphonates onto the suspended solids in the water; and
    maintaining a differential pressure across the microfiltration or ultrafiltration membranes that is less than or equal to 5 bar.

5. A method of treating water containing suspended solids and metal ions comprising:
    filtering the water in one or more microfiltration or ultrafiltration membranes while maintaining the differential pressure on either side of the membrane less than or equal to 5 bar to generate a first permeate and a first concentrate;
    flowing the water tangentially to the microfiltration or ultrafiltration membranes at a velocity of at least 0.1 m/s during said filtering;
    mixing an organic sequestering agent comprising organic phosphonates with the water at or upstream of the microfiltration or ultrafiltration membranes at a concentration effective for sequestering metal ions contained in the water and minimizing the formation of calcium carbonate; and
    filtering at least a portion of the first permeate in one or more nanofiltration or reverse osmosis membranes to produce a second permeate and a second concentrate.

6. The method according to claim 5, in which the addition of the sequestering agent promotes the capture of metal ions, prevents the precipitation of calcium carbonate and promotes the filtration of water through the pores of the membrane.

7. The method according to claim 5, further comprising maintaining the concentration of organic phosphonate in the water flowing across the microfiltration or ultrafiltration membranes at 0.25 mg/L to 4 mg/L.

8. The method according to claim 5, further comprising anaerobically digesting the first concentrate in a first anaerobic digester to produce a biogas.

9. The method according to claim 8, further comprising converting the biogas into energy that can be used on site.

10. The method according to claim 8, further comprising removing nitrogen produced in the anaerobic reactor in a biological reactor constituted by fixed bacteria.

11. The method according to claim 10, in which the biological reactor with fixed bacteria is a moving bed bioreactor or MBBR so as to combine nitration and anoxic oxidation of ammonia through the development of a biofilm on a plastic support moved by agitation or aeration.

12. The method of claim 5 wherein the water comprises a raw water and wherein the filtering of the raw water in one or more microfiltration or ultrafiltration membranes is performed with no pre-treatment of the raw water except for de-oiling and screening.

\* \* \* \* \*